G. W. Brown.
Animal Trap.
N° 71,693. Patented Dec. 3, 1867.
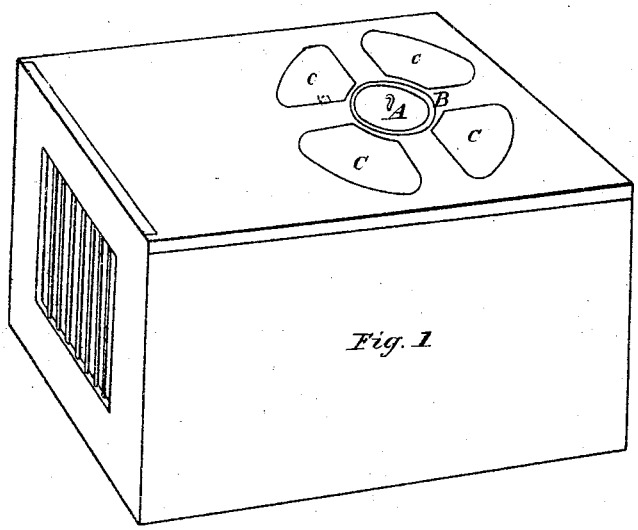
Fig. 1
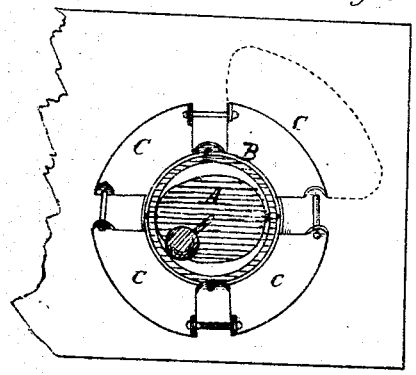
Fig. 2
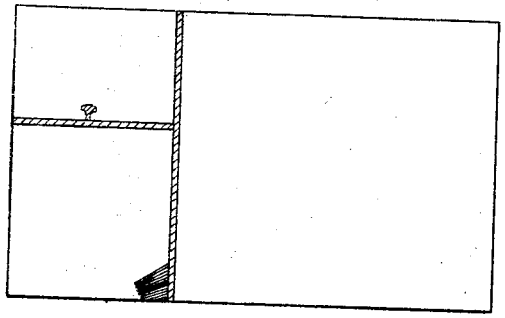
Witnesses
Inventor
G. W. Brown

UNITED STATES PATENT OFFICE.

GEORGE W. BROWN, OF SACRAMENTO, CALIFORNIA.

IMPROVED ANIMAL-TRAP.

Specification forming part of Letters Patent No. 71,693, dated December 3, 1867.

*To all whom it may concern:*

Be it known that I, GEORGE WASHINGTON BROWN, of the city and county of Sacramento, State of California, have invented a new and Improved Animal-Trap, to be so formed as to be placed upon a box, cage, or pit.

To enable others to readily understand the nature of my invention, I will proceed to describe it; and I do declare that the following is an exact description thereof, reference being had to the accompanying drawings and letters marked thereon.

The nature of my invention consists in having placed upon a box, cage, or pit a tipping plate, (see Figure 1, letter A,) said plate to be balanced upon pivots and surrounded by a ring, B, which is also hung upon pivots running in a line vertical to the line of the plate's pivots, so that said plate can be tipped in any direction, similar to a compass-box, said plate to be kept in a horizontal position by means of a wire and ball hanging downward from the middle of said plate. (See Fig. 2, letter *r*.) The center of said plate is provided with a small hook, to which is to be attached the bait. Surrounding said center plate are arranged four triangular plates. (See Fig. 1, letter *c*.) Said four plates are balanced on pivots, (see Fig. 2, letter *c*;) so as soon as an animal steps upon said plates they tip inward and throw the animal toward the bait, and from thence, by the tipping of said center plate, he falls through into the box or pit underneath.

What I claim as my invention, and desire to secure by Letters Patent, is—

The arrangement of the tipping plates, as described, and for the purpose set forth.

G. W. BROWN.

Witnesses:
    J. H. PEIRCE,
    A. G. WATERHOUSE.